June 10, 1952 W. H. VON HACHT 2,600,346

LINE SPACING PLATEN FOR FLAT-BED TYPEWRITING MACHINES

Filed June 30, 1949 11 Sheets-Sheet 1

INVENTOR.
William H. von Hacht
BY Jesse A. Holton
ATTORNEY

June 10, 1952 W. H. VON HACHT 2,600,346

LINE SPACING PLATEN FOR FLAT-BED TYPEWRITING MACHINES

Filed June 30, 1949 11 Sheets-Sheet 2

INVENTOR.
William H. von Hacht
BY Jesse A. Holton
ATTORNEY

June 10, 1952 W. H. VON HACHT 2,600,346

LINE SPACING PLATEN FOR FLAT-BED TYPEWRITING MACHINES

Filed June 30, 1949 11 Sheets-Sheet 3

INVENTOR.
William H. von Hacht
BY Jesse A. Holton
ATTORNEY

June 10, 1952 W. H. VON HACHT 2,600,346

LINE SPACING PLATEN FOR FLAT-BED TYPEWRITING MACHINES

Filed June 30, 1949 11 Sheets-Sheet 4

INVENTOR.
William H. von Hacht
BY Jesse A. Holton
ATTORNEY

June 10, 1952 W. H. VON HACHT 2,600,346

LINE SPACING PLATEN FOR FLAT-BED TYPEWRITING MACHINES

Filed June 30, 1949 11 Sheets-Sheet 5

INVENTOR
William H. von Hacht
BY Jesse A. Holton
ATTORNEY

June 10, 1952 W. H. VON HACHT 2,600,346

LINE SPACING PLATEN FOR FLAT-BED TYPEWRITING MACHINES

Filed June 30, 1949 11 Sheets-Sheet 6

INVENTOR.
William H. von Hacht
BY Jesse A. Holton
ATTORNEY

LINE SPACING PLATEN FOR FLAT-BED TYPEWRITING MACHINES

Filed June 30, 1949

INVENTOR.
William H. von Hacht
BY Jesse A. Holton
ATTORNEY

June 10, 1952 W. H. VON HACHT 2,600,346

LINE SPACING PLATEN FOR FLAT-BED TYPEWRITING MACHINES

Filed June 30, 1949 11 Sheets-Sheet 8

INVENTOR.
William H. von Hacht
BY Jesse A. Holton
ATTORNEY

June 10, 1952 W. H. VON HACHT 2,600,346

LINE SPACING PLATEN FOR FLAT-BED TYPEWRITING MACHINES

Filed June 30, 1949 11 Sheets-Sheet 9

INVENTOR.
William H. von Hacht
BY Jesse A. Holton
ATTORNEY

LINE SPACING PLATEN FOR FLAT-BED TYPEWRITING MACHINES

INVENTOR.
William H. von Hacht
BY Jesse A. Holton
ATTORNEY

LINE SPACING PLATEN FOR FLAT-BED TYPEWRITING MACHINES

Filed June 30, 1949 11 Sheets-Sheet 11

INVENTOR.
William H. von Hacht
BY Jesse A. Holton
ATTORNEY

Patented June 10, 1952

2,600,346

UNITED STATES PATENT OFFICE 2,600,346

LINE SPACING PLATEN FOR FLAT-BED TYPEWRITING MACHINES

William H. von Hacht, Bronxville, N. Y., assignor to Underwood Corporation, New York, N. Y., a corporation of Delaware Application June 30, 1949, Serial No. 102,271

15 Claims. (Cl. 197—2)

This invention relates to a typewriting machine, and more particularly to a flat platen typewriter in which the printing head is mounted in a carriage for transverse movement across the machine and the platen is movable in line space and return directions.

It is an object of the present invention to produce a novel organization of the machine which will simplify the construction thereof and reduce to a minimum the effort and attention required of the operator.

It is also an object of the present invention to devise a typewriting machine of the flat platen type in which the platen moves in the line space direction to thereby maintain the keyboard at an invariable distance from the operator.

A further object is to provide in a machine of this type, a platen automatically movable in line spacing direction as an incident to return of the carriage to a predetermined position and also automatically returnable to an initial line space position incidental to return of the carriage to a different predetermined position.

Still a further object of this invention is to provide a flat platen typewriting machine in which an automatically line spaced platen is selectively line spaced or returned to an initial position under control of the carriage return keys.

Another object is to provide a flat platen machine in which the platen is automatically line spaced with a tally roll attachment, the line spacing paper feed of such tally roll being operated separately from the line spacing of the platen.

It is also an object of this invention to provide in a flat platen machine having a tally strip, a line space feed mechanism for the platen and a line space feed mechanism for the tally strip, a separate disabling means for each line space feed mechanism so that the two feeds may be used separately or jointly.

GENERAL DESCRIPTION

The main frame of the machine comprises a base support and a pair of rigid grooved rails each with a slotted supporting bracket near the rear end of the rail together with such braces between the rails as may be necessary. A carriage frame with a pair of rails to carry a typing head transversely across the frame is mounted in the slotted brackets. This carriage frame supports the line spacing and carriage return mechanisms and the power drive for the machine. The typing head is, in general, similar to those already well known in this type of machine and moves laterally along the rails of the carriage frame in response to the operation of the keys of the typing head. The platen upon which the type of the typing head strike is mounted for forward and backward movement in a platen frame movable in the slotted rails of the frame. The platen frame also carries such carbon paper holders as may be required and is moved one line space rearwardly upon each carriage return movement of the type head to a predetermined position. The platen frame is normally biased for movement forward of the frame and may be released for return to the initial line space position by return of the type carriage to its leftmost return position.

A roll of tally paper is mounted in the front part of the frame so that the paper may pass over the platen and thence through a pair of feed rolls to discharge under the frame. The tally paper strip is line spaced independently of the platen but simultaneously therewith so that each reciprocation of the type head prints on a different line. Separate disabling means are provided for the platen feed and tally strip feed mechanism so that the platen or tally strip or both may remain stationary as desired.

The carriage frame with the type carriage is capable of being rotated to a vertical position to provide full access to the platen and carbon paper strips.

*Main frame*

(Figures 1, 2, 3 and 5.)

Figure 5:
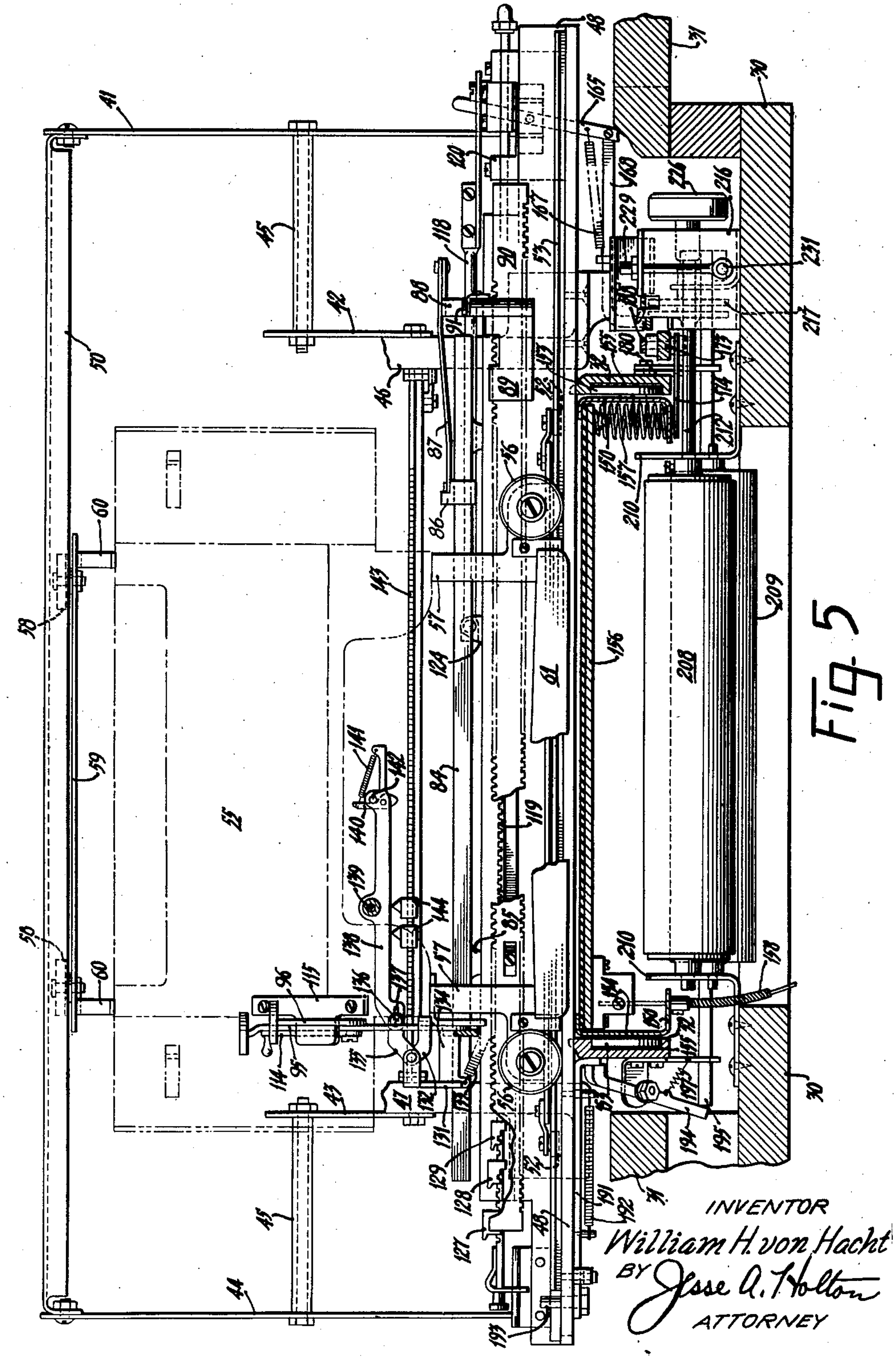
Figure 5 is a front view of part of the variable carriage return mechanism, parts of the platen and tally roll feed mechanisms being also shown.
Figure 6:
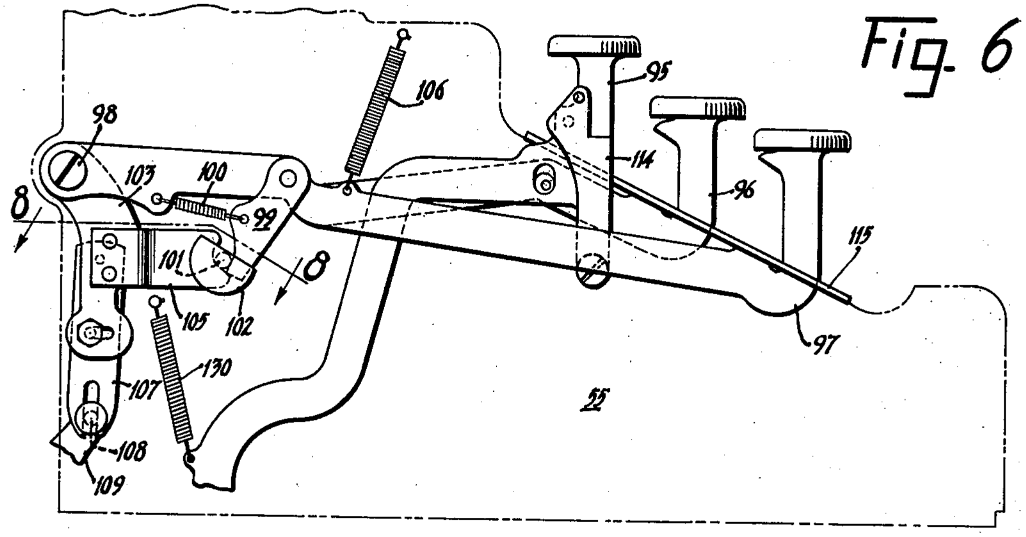
Figure 6 is a left side view of the carriage return keys.
Figures 7, 8:
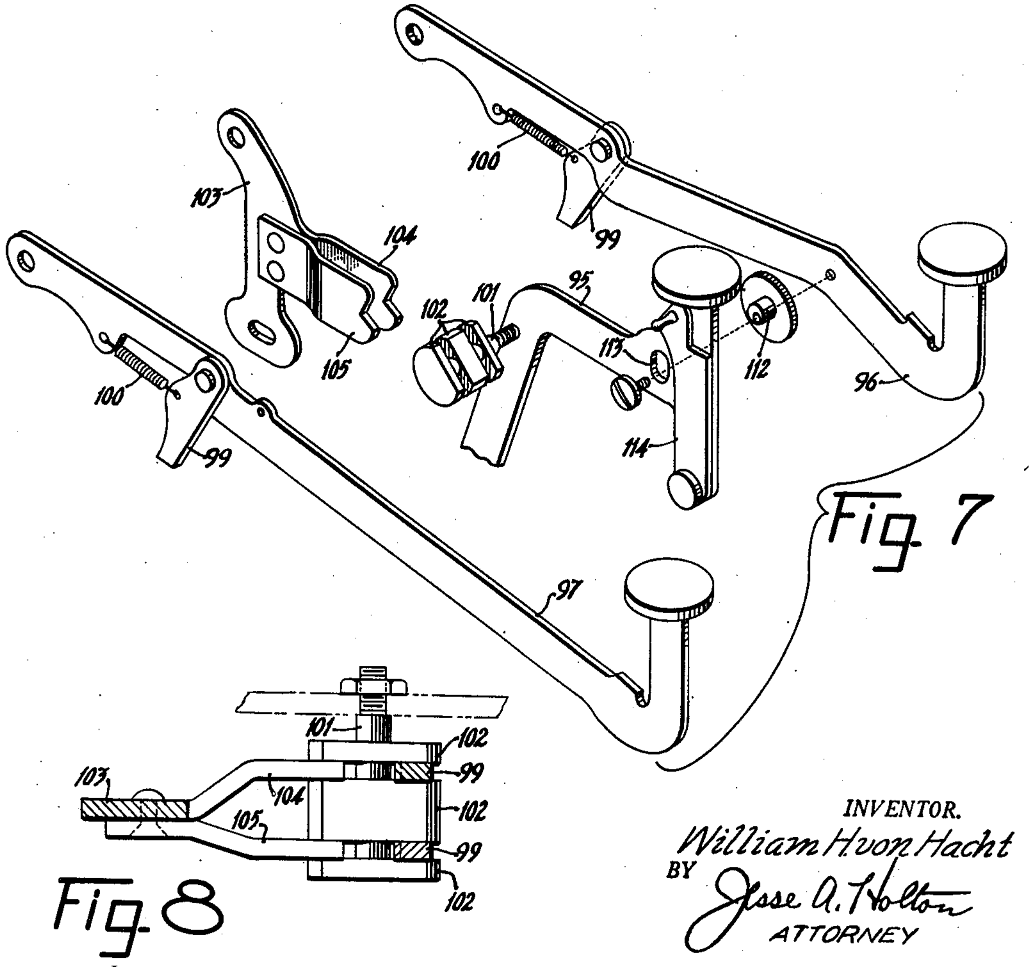
Figure 7 is an exploded perspective view of the parts shown in Figure 6.
Figure 8 is a detail view taken along the line 8—8 of Figure 6.
Figure 16:
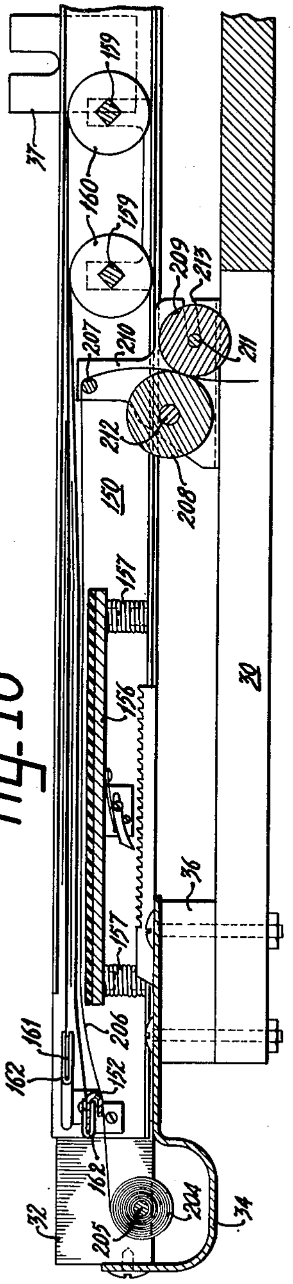
Figure 16 is a side view taken along the line 16—16 of Figure 15.
Figure 14:
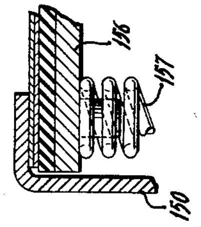
Figure 14 is a detail view showing the manner of mounting the platen in a platen frame.
Figures 17, 18:
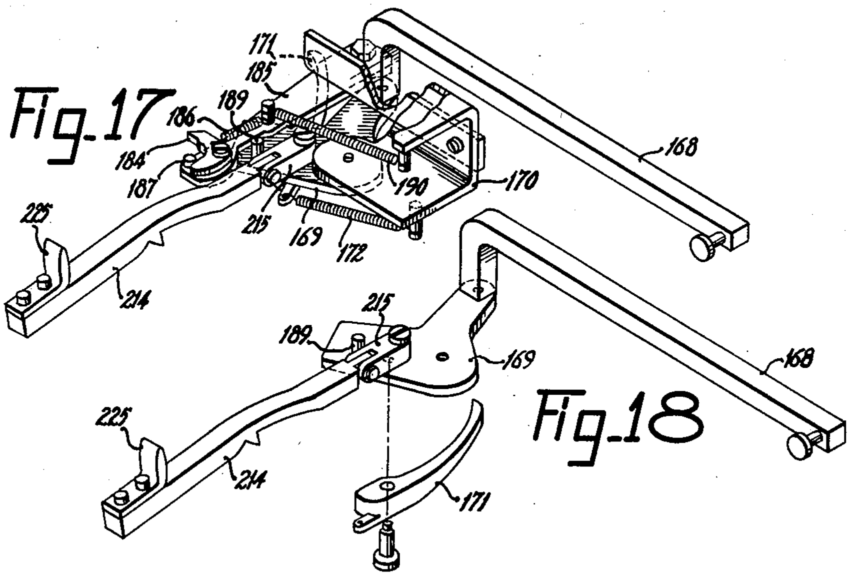
Figure 17 is a perspecttive view of the line spacing mechanism for the platen and tally roll.
Figure 18 is a perspective view, partly exploded, of some of the parts of Figure 17.

The main frame comprises a base plate 30 which may be secured to desk 31 or other suitable supporting structure. A pair of grooved side rails 32 are joined by a rear bar 33, Figure 3, and a bent front plate 34, Figures 1 and 16, to form a frame, which frame is mounted on the base plate 30 by a pair of vibration insulators 35 at the rear end and is fastened to blocks 36 on the base 30 at the front end. As is indicated in Figures 5 and 16, the base 30 is recessed from the front and under the frame for approximately one-half of the full front to rear distance to provide clearance for the tally roll strip as will be hereinafter described.

Figure 1:
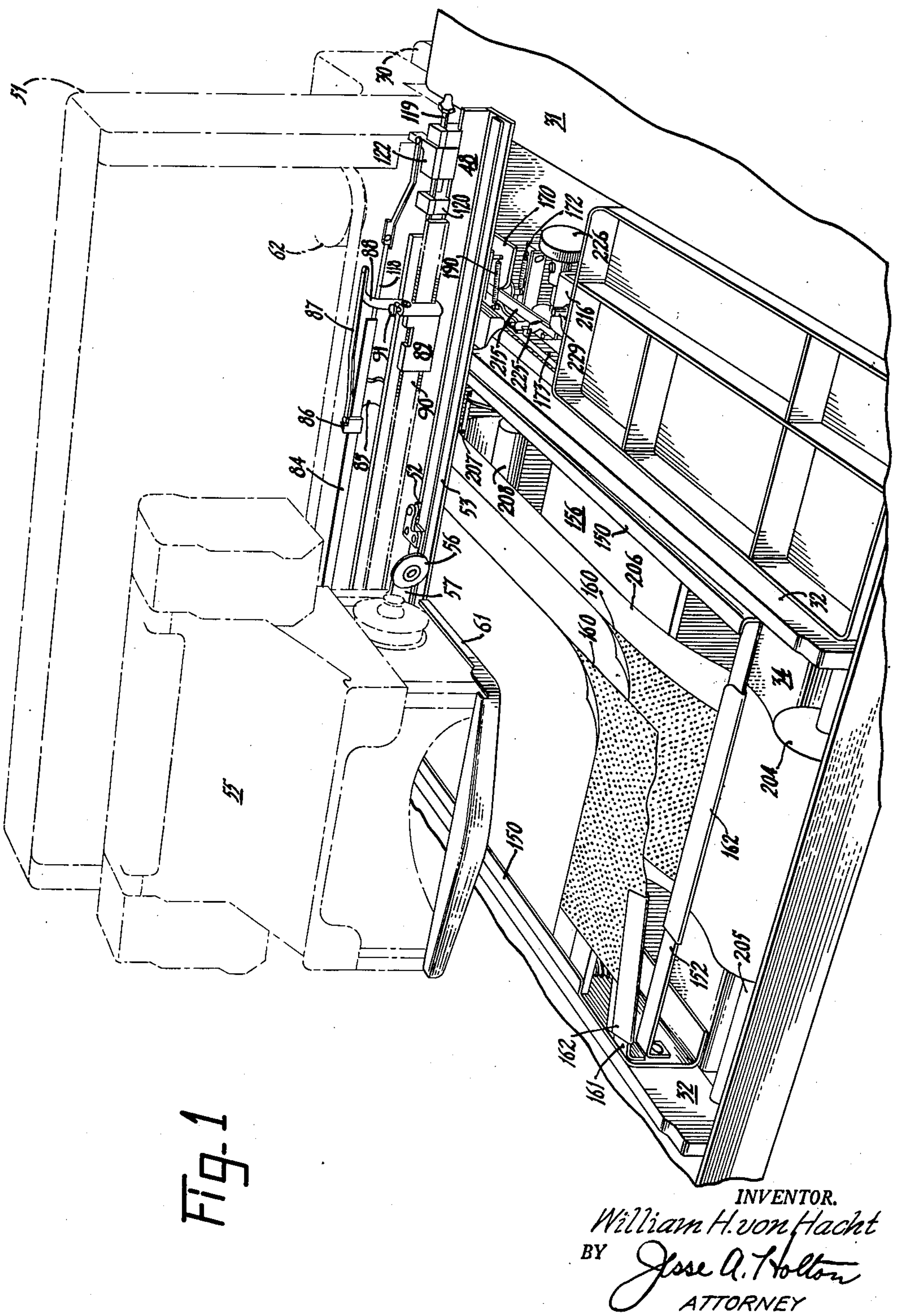
Figure 1 is a perspective view showing the general relationship of the parts of the invention.
Figure 2:
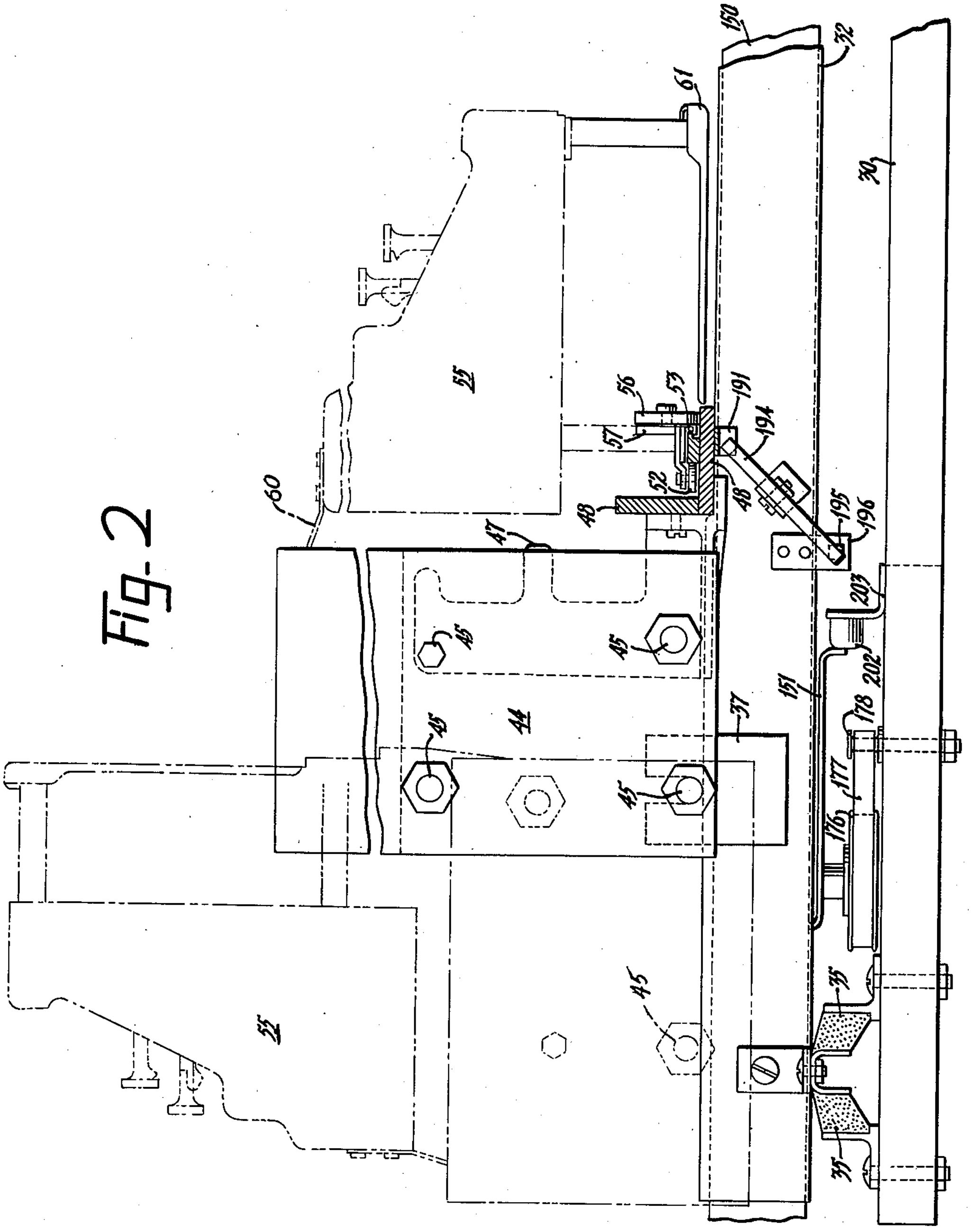
Figure 2 is a side view showing the carriage frame and keyboard in both their operative and ineffective positions.
Figure 3:
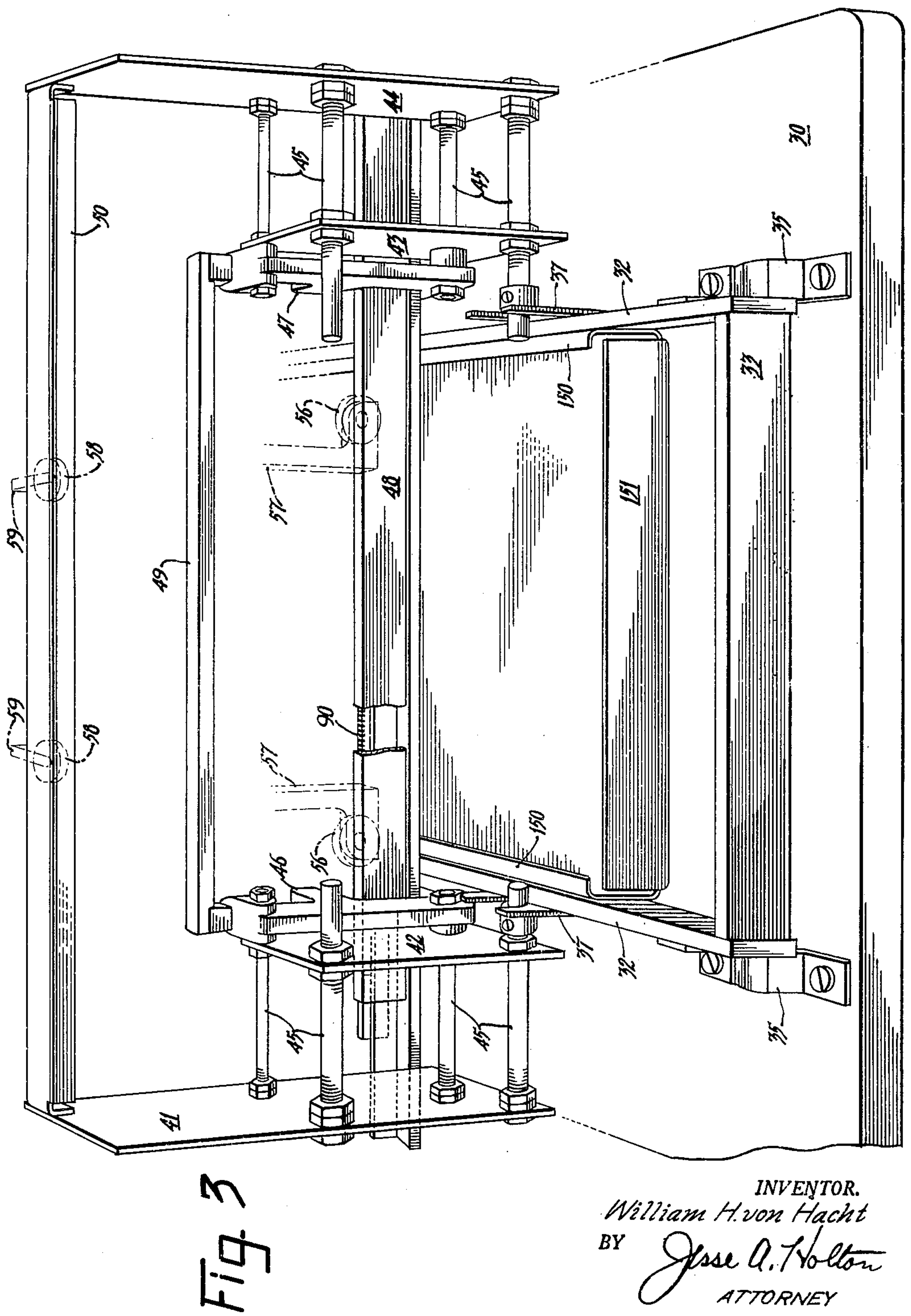
Figure 3 is a rear perspective view showing a part of the main frame with the carriage frame mounted in normal position.

Fixed to the outside of each side rail 32 near the rear end, Figures 2 and 3, is a slotted bracket 37. A type carriage frame, Figure 3, rests at its rear end in the slots of brackets 37 and is supported at its forward end on the tops of rails 32. The type carriage frame comprises generally four plates 41, 42, 43, and 44, spaced apart by a plurality of bolts 45, the four rear bolts 45 being extended inwardly above the side rails 32. The lower rear bolts 45 rest in the slots of brackets 37 to provide a pivot point and the upper rear bolts 45 rest on the rear ends of rails 32 to support the carriage frame when it is tilted rearwardly as indicated in dotted lines in Figure 2. The forward bolts 45 also secure to the inner sides of plates 42 and 43 a pair of brackets 46 and 47 which extend forwardly of plates 42 and 43 to support an L-shaped lower carriage track 48. A bar 49 is carried between the upper ends of brackets 46 and 47 to provide a column register supporting bar similar to bar 286 in U. S. Patent No. 2,370,505, issued February 27, 1945 to O. J. Sundstrand. Fixed between the upper front corners of the outer plates 41 and 44 is an inverted channel bar 50 which constitutes the upper track for the type bar carriage. The bar 48 in addition to acting as a lower carriage track carries a number of operating parts which will be described in detail under later headings. If desired, a detachable cover 51 of the type indicated in dotted lines in Figure 1 may be provided to cover the rear of the carriage frame.

*Type carriage*

Figure 4:
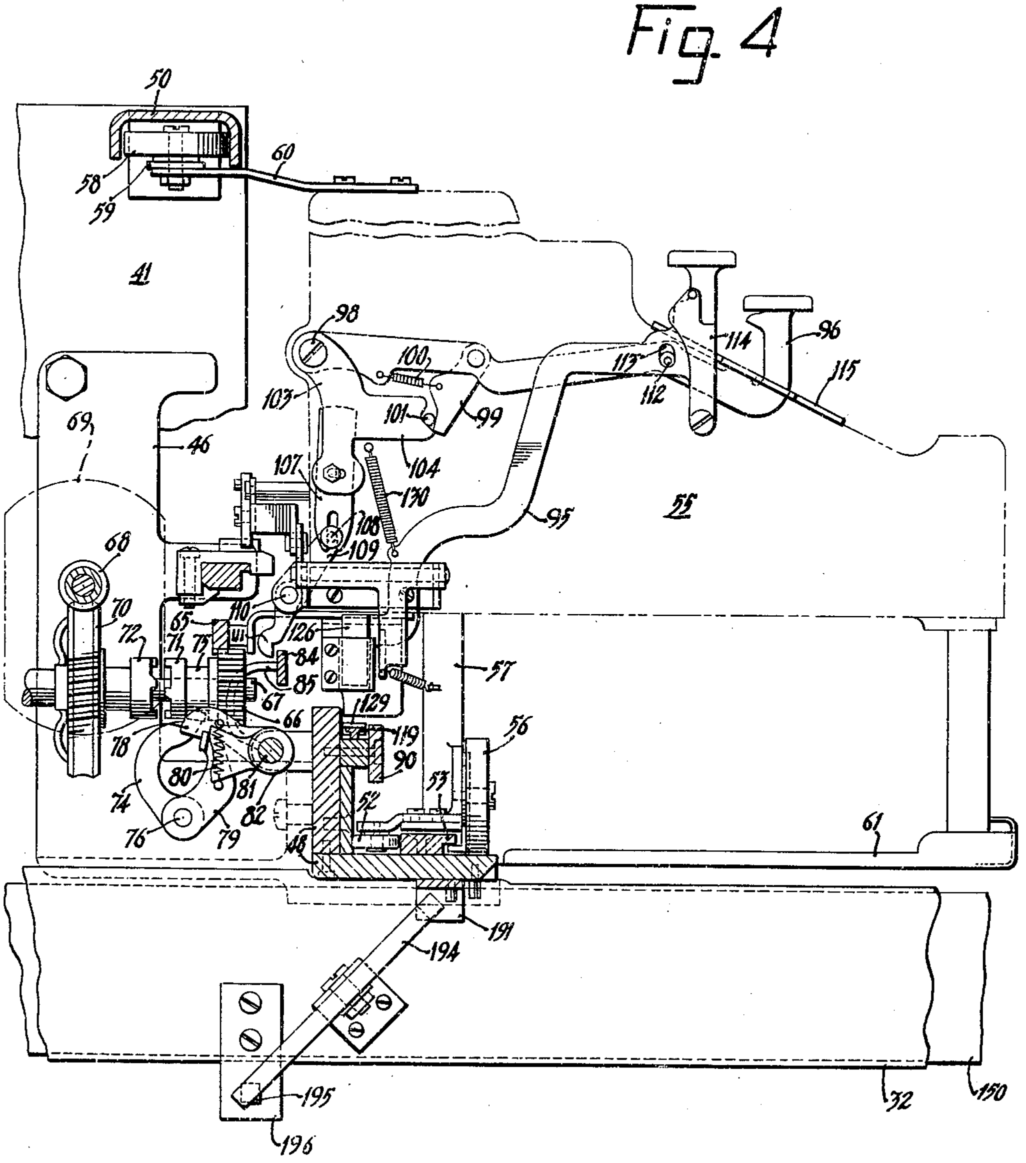
Figure 4 is a left side view showing the variable carriage return keys and mechanism controlled thereby.

(Figures 1, 2 and 4.)

The type carriage, indicated generally at 55, may be similar in general to that shown in the Sundstrand Patent No. 2,370,505 previously mentioned or any other model of the well known Elliott Fisher typewriter heads. This type carriage 55 and the typing actions are well known in the art and the present description will therefore be restricted to the changes required for the use of this head on the present carriage frame. The type carriage 55 is mounted for lateral movement in the carriage frame by a pair of rollers 56 rotatable on a bracket 57 fixed to the rear of the carriage 55 and running on the lower rail of the track 48. Rollers 56 are retained on the track 48 by a pair of horizontal rollers 52 secured to the bracket 57 and resting behind a bar 53 secured to the track 48 between the two sets of rollers 52 and 56. The top of the carriage 55 is guided by a pair of rollers 58 engaged in the channel bar 50, each roller 58 being rotatably mounted on a bar 59 supported by a pair of arms 60 fixed to the top of the type carriage 55. This construction renders unnecessary the front rail generally used with typing carriages of this type and allows a guard pan 61 to be placed under the type head to prevent projecting parts of the type actions from tearing or wrinkling papers being typed upon. This guard pan 61 also enables an operator to insert papers under the typing carriage from the side thereof, a feature particularly desirable when long forms are being used.

The typing carriage 55 is letter spaced and tabulated to the right by the usual spring drum and tape 62 under control of an escapement and tabulating mechanism (not shown) which is substantially as shown in the above mentioned Patent No. 2,370,505.

*Type carriage return mechanism*

(Figures 1 and 4 to 12, inclusive.)

A power driven mechanism to return the type carriage to one of three left hand positions is incorporated in the machine of the present disclosure. This return mechanism is substantially the same as that of the Sundstrand Patent No. 2,370,505 above, but is modified to provide for three positions to which the carriage may be returned. A rack bar 65 is fixed to the rear of the type carriage 55 and is in mesh with a pinion 66 freely rotatable on a constantly rotating shaft 67 mounted on the carriage frame. Shaft 67 is driven by a worm 68 fixed on the shaft of a motor 69 on the carriage frame, worm 68 meshing with a worm gear 70 fixed to shaft 67. Pinion 66 is slidable on shaft 67 and has fixed thereto a clutch member 71 slidable into engagement with a similar clutch member 72 on shaft 67. Rearward movement of clutch member 71 and pinion 66 will engage clutch members 71 and 72 and cause pinion 66 to be rotated and, through rack 65 meshing therewith, will drive the type carriage 55 toward the left.

Pinion 66 is normally held in its forward ineffective position by an arm 74 engaging in a groove 75 in the hub of pinion 66. Arm 74 is mounted on a shaft 76 supported in brackets 77 fixed to a stationary part of the carriage frame. Shaft 76 is tensioned counterclockwise in Figure 12 by a spring 73 connected to an arm 125 thereon but is normally latched in a position to maintain disengagement of clutch members 71 and 72 by the latching engagement of a latch member 78 with an arm 79 extending from the end of the shaft 76, see also Figures 11 and 12. Latch 78 is freely rotatable on a shaft 81 and is biased into latching position with arm 79 by a spring 80 connected between studs on latch 78 and arm 79. Shaft 81 is rotatable in bearings 82 fixed to the rear of carriage rail 48 and carries an interponent 83 fixed thereto and underlying the stud of latch member 78. Shaft 81 also carries a bail 84 extending upwardly therefrom by means of several bent arms 85 fixed to the shaft 81 and bail 84. A cam 86 is slidably positioned on the bail 84 and retained in set position by a link 87 connected to an arm 88 on a settable detent member 89. Detent member 89 is movable on a rack bar 90 fixed to the carriage rail 48 and is releasably secured thereto by a latch 91 on member 89 which latch 91 is biased to engage the teeth of rack bar 90 and hold the detent member 89 and cam 86 in their set positions. Cam 86 is engageable at a point in the travel of the carriage 55 determined by the positioning of member 89 by a cam (not shown) fixed to the type carriage 55 to rock the bail 84 forwardly to release latch 78. Release of latch 78 frees shaft 76 to the action of spring 73 for counterclockwise rotation to shift the clutch member 71 of pinion 66 into engagement with clutch member 72 and initiate the carriage return operation.

The carriage 55 may also be returned toward the left by manual operation of any one of three carriage return keys 95, 96 and 97, Figures 4, 6, 7 and 8. Keys 96 and 97 are pivoted on a screw 98 and each key lever carries intermediate its ends a pivoted depending pawl 99. A spring 100 connected between the pawl 99 and a rearward portion of the associated key 96 or 97 biases the lower end of the pawl to the rear into engagement with a stationary stud 101. Three flanges 102 are formed on the stud 101 to prevent sideward movement of the pawls 99. Also pivoted on screw 98 between the keys 96 and 97 is a depending lever 103 formed with a forwardly extending notched arm 104 and a second arm 105, similar to arm 104 and spaced apart from arm 104, secured thereto. The two arms 104 and 105 enter between the flanges 102 to abut stud 101 and normally rest with the lower face of their notch under one of the pawls 99. Operation of either key 96 or 97 will thus rock lever 103 clockwise in Figure 6, the interaction of the pawl 99 and stud 101 thereafter moving the pawl 99 away from the respective arms 104 and 105. Keys 96 and 97 are biased to their normal positions by springs 106 connected between the keys 96 and 97 and a stud on the frame of type head 55.

A slotted extension member 107 is adjustably secured to lever 103 and engages a stud 108 fixed in the upper end of an arm 109 secured to a shaft 110, see Figure 4, rotatable in bearings on the rear of the type carriage 55. Shaft 110 carries a second arm 111 secured thereto, arm 111 being normally positioned slightly to the rear of bail 84. When lever 103 is moved clockwise by key 96 or 97 as above described, it rocks shaft 110 counterclockwise to engage arm 111 with bail 84 and move the bail clockwise to release the carriage return latch 78 and initiate return of the carriage 55.

A third key 95 is provided which is connected to key 96 by a pin 112 adjustably secured on key 96 resting at the bottom of a slot 113 in key 95 so that depression of key 96 causes an equal depression of key 95. Due to the length of slot 113, however, key 95 will have a slight free movement before it carries key 96 down with it to release the carriage return drive latch 78. The stem of key 95 will thus be moved different distances depending upon whether key 95 or key 96 is depressed. This movement of key 95 is utilized to arrest the return of carriage 55 at one of two points prior to a full returned position of the carriage. Key 95, see Figure 6, has pivoted to its side a latch 114 which may, when the key 95 is depressed, be manually engaged with the underside of the key plate 115 to retain key 95 fully depressed. Operation of either of the remaining keys 96 or 97 will then merely cause engagement of the carriage return drive and the carriage 55 will be arrested at the rightmost return point.

The carriage return drive is disengaged, see Figures 4, 10, 11 and 12, by the movement to the left of a slide 119 slidable in guides 120 fixed to carriage rail 48. Slide 119 is held in its right hand position by a spring 121 between the slide 119 and its guide 120 and carries near its right end a block 122 having a lug 123 projecting rearwardly. A link 118 is connected at one end to lug 123 and is extended to connect with an arm of a lever 124, Figures 11 and 12, pivoted on the rail 48 near its center. The other arm of lever 124 rests on an arm 125 fixed to the carriage return pinion shifting shaft 76. The leftward movement of slide 119 is, after a short initial free movement, transmitted through link 118 to rock lever 124 and shaft 76 to shift the carriage return pinion 66 to the disengaged position, arm 79 of shaft 76 being thereby restored to control of latch 78.

Figures 9, 10:
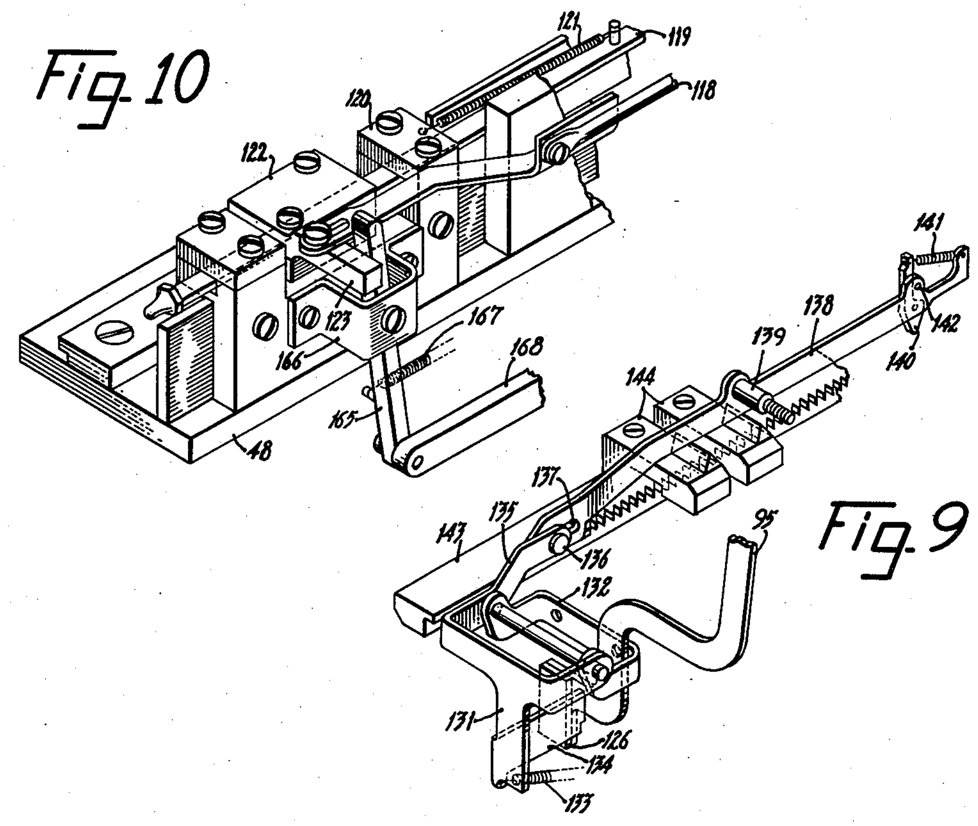
Figure 9 is a view showing the variably positioned stop for the carriage return mechanism and the release mechanism therefor.
Figure 10 is a perspective view of a part of the carriage return terminating means.
Figures 11, 12:
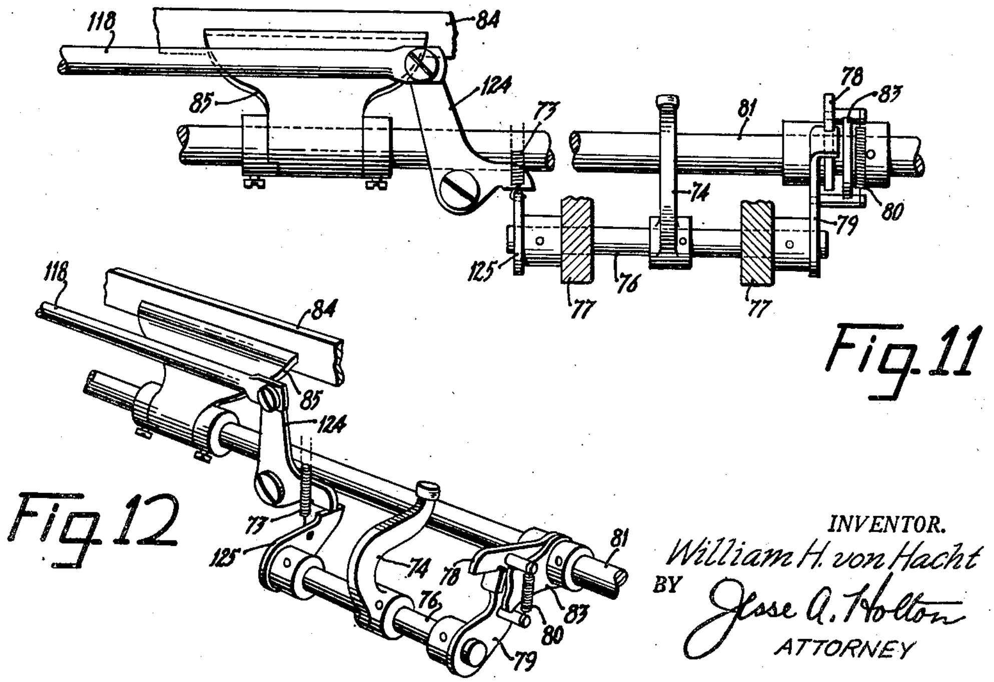
Figures 11 and 12 are rear and rear perspective views respectively of the carriage return initiating and terminating mechanism.

The leftward movement of slide 119 is effected at different points in the return movement of the carriage 55 under control of the keys 95, 96, and 97. As shown in Figure 9, the lower end of key 95 is reinforced with a plate 126 and normally rests above slide 119. Slide 119, see also Figure 5, is notched along its length and carries near its left end several blocks 127, 128, and 129 of graduated heights each block adjustable along the slide 119. In the normal position of key 95, its lower end is so positioned that it will, during the leftward return movement of the carriage, strike only the highest block 127 to arrest the carriage return at the leftmost return position. Key 95 is not depressed when the carriage return drive is released by key 97 or when cam 86 is operated and thus these two initiating members will cause a full return of carriage 55. As has been described, depression of key 96 will move key 95 to an intermediate depressed position and initiate return of carriage 55. With key 95 in the intermediate position, its lower end will engage the block 128 which is lower than block 127 and thus cause arrest of the carriage 55 and disengagement of the carriage return drive pinion 66 before the carriage 55 has reached its fully returned position.

The carriage 55 may be arrested before the lower end of key 95 reaches block 128 by operation of key 95. This as has been explained will depress key 95 to its lowermost position and in such position the block 129 will be engaged by key 95 to stop carriage return before block 128 is reached. The three keys 95, 96 and 97 will then cause return of the carriage 55 to a desired one of the three points of termination and since blocks 127, 128, and 129 are adjustable at will, the carriage 55 may be returned to any three positions desired.

As it is not desirable that the operator maintain key 95 depressed during the full extent of the carriage return movement and as spring 130 tends to return key 95 to its normal position for a full return, a latch 131, Figures 5 and 9, is provided to retain key 95 in either of its depressed positions. Latch 131 is pivoted on a bracket 132 secured to the side of carriage 55 and is biased by a spring 133 to press its notched arm 134 into engagement with a horizontal section of key 95. Either the top of the notch or the bottom edge of the notched arm of latch 131 can engage the horizontal section of key 95 and thus the key 95 may be retained in either its intermediate or fully depressed position.

Latch 131 is released to permit restoration of key 95 by the letter space movement of the carriage 55 after a carriage return movement has been completed. A rear arm 135 carries a pin 136 engaging in a slot 137 in an arm of a lever 138 pivoted on a stud 139 fixed in the rear of carriage 55. The other arm of lever 138 carries a pawl 140 tensioned clockwise in Figures 5 and 9 by a spring 141 into engagement with a stud 142 of lever 138. A notched bar 143 fixed between brackets 46 and 47 of the carriage frame carries two cam blocks 144 adjustably secured thereon in position to engage pawl 140 of lever 138. During the leftward movement of the carriage, the pawl 140 is rocked counterclockwise against the tension of its spring 141 as it passes over these cam blocks 144 but during the letter spacing movement of carriage 55 to the right, engagement of pawl 140 and a cam block 144 will rock lever 138 counterclockwise to release latch 131 from key 95. The cam blocks 144 are positioned to be effective to cause release of key 95 after the carriage 55 moves a few letter spaces to the right of either of the two short carriage return positons. The carriage return keys 95 and 96 are then available to again initiate a carriage return operation.

*Platen and platen carriage*

(Figures 5, 13, 14, 15 and 16.)

The present machine includes a flat platen mounted in a shiftable carriage to provide for line spacing. The platen carriage comprises a pair of side channel members 150 spaced apart by a formed plate 151 at the rear and a strip 152 at the front end. A roller 153 is mounted on a stud 154 fixed near each end of each side channel 150. The rollers run in a channel 155 in the side frame members 32 which guide the platen frame for forward and backward movement. A platen 156 is mounted in the forward part of the platen frame and is pressed against the upper flanges of the side channels 150 by four springs 157, one spring 157 being positioned between each corner of the platen and the lower flange of the side channels 150. Blocks 146, Figure 13, each carrying a horizontal stud 145, are secured to each rear corner of the platen 156. Each stud 145 is vertically movable in a slot formed in a bracket 147 secured to one of the side frame members 150 to permit vertical movement of platen 156 but restrain it from any horizontal movement independent of the platen frame. The platen may be depressed to insert papers to be typed upon between the upper flange of the left side channel 150 and the platen either manually or by a foot pedal (not shown) connected by a Bowden wire 158 to the left side of platen 156.

A pair of shafts 159 rotatable in the rear section of the side channels 150 are provided to hold rolls of carbon paper 160. Carbon paper from these rolls may be passed forward over the platen and clamped to strip 152 and a shorter strip 161 on the side frame 150 by channel clips 162.

*Platen carriage line spacing mechanism*

(Figures 10 and 17 to 21 inclusive.)

The platen frame 150, 151, 152 is moved rearwardly to line space the type characters at each return movement of the type carriage 55. As may be seen in Figure 10, a lever 165 pivoted on a bracket 166 fixed to track 48 is biased by a spring 167 into engagement with lug 123 of block 122 on slide 119 and is rocked clockwise by slide 119 at the completion of each return movement of carriage 55. A bent link 168 is pivoted at one end to the lower end of lever 165 and at the other end to a line space plate 169 pivoted on a bracket 170 secured to the carriage frame. A line space pawl 171 is pivoted to the bottom of plate 169 and is tensioned by a spring 172 connected between it and bracket 170 into engagement with a line space rack 173 secured by arms 174 to the right side platen frame channel 150. Movement of slide 119 to the left at the end of a return of carriage 55 will as indicated rotate plate 169 clockwise in Figure 18 to move pawl 171 and, through the engagement of pawl 171 and rack 173, the platen frame one line space to the rear. On the return movement of slide 119 when carriage 55 is letter spaced, pawl 171 passes idly over and reengages with the next tooth of rack 173 in readiness for another line spacing operation.

Figure 13:
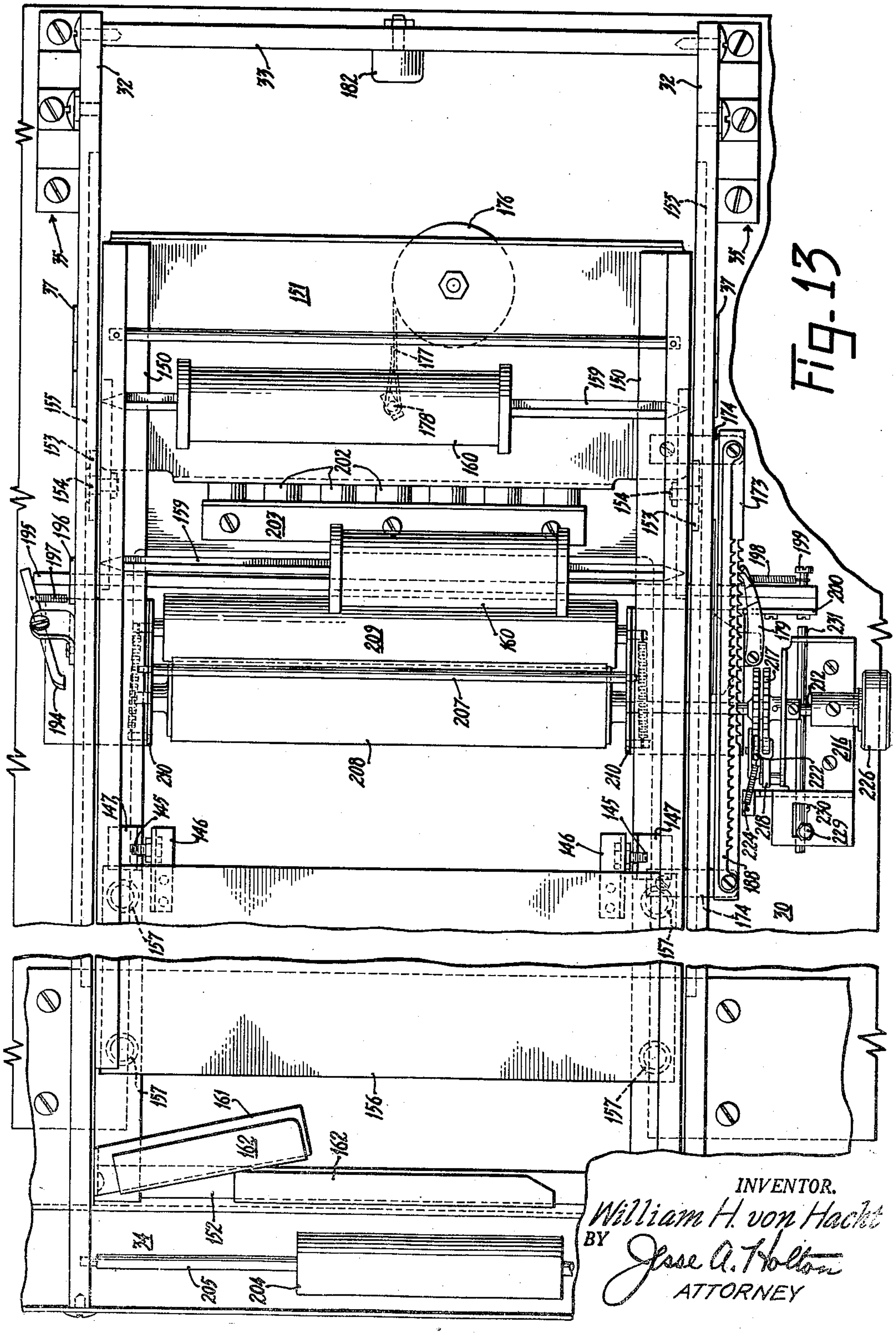
Figure 13 is a top view of the line spacing platen frame, platen, and part of the tally roll feed mechanism.
Figure 15:
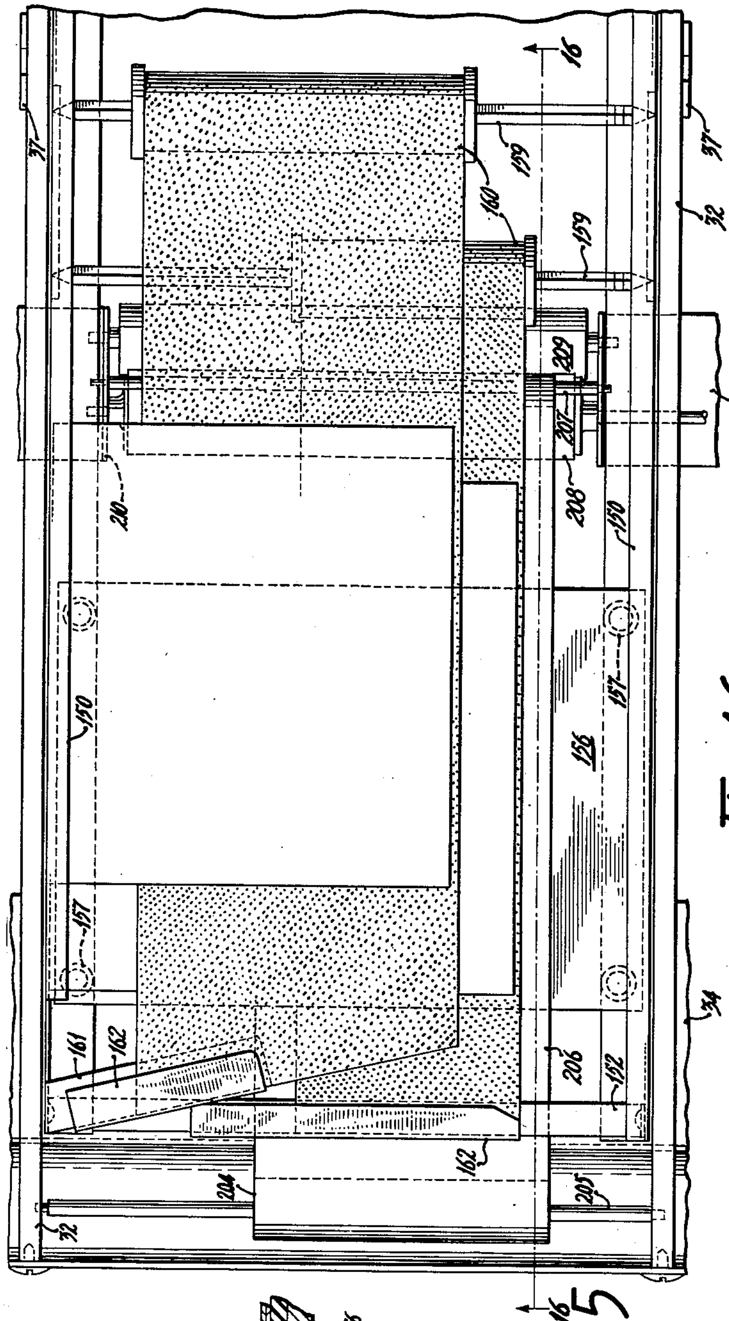
Figure 15 is a view showing the manner in which the carbon paper, statement sheets and tally roll are positioned relative to the platen.
Figure 21:
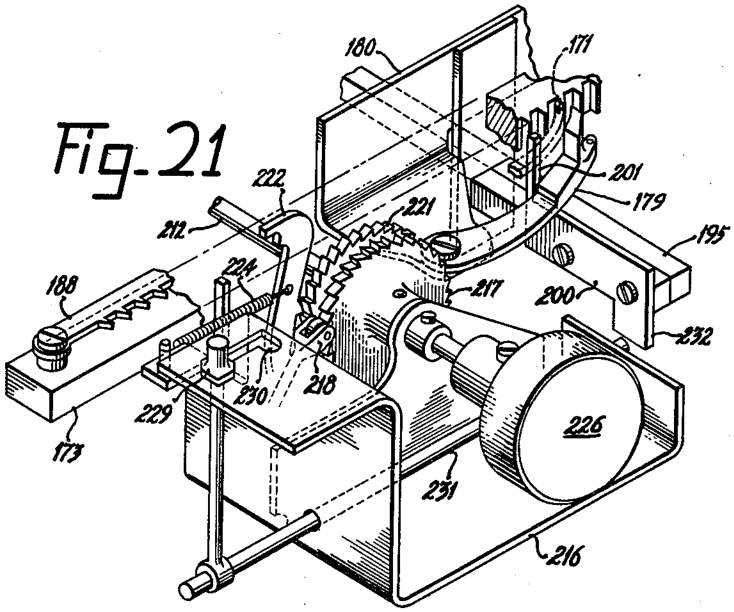
Figure 21 is a perspective showing of the means to disable the platen line spacing means.
Figure 22:
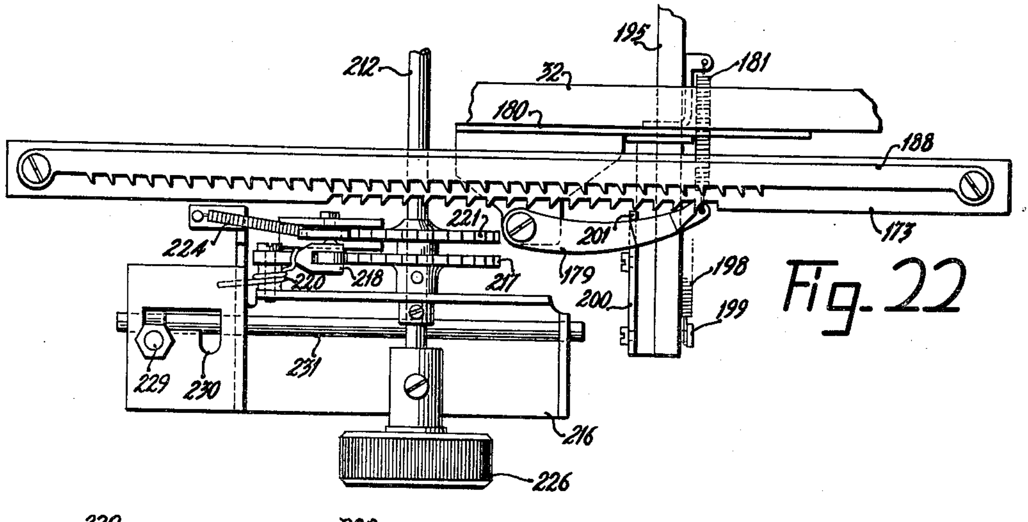
Figures 22 and 23 are respectively top and side views of the mechanism shown in Figure 21.
Figure 23:
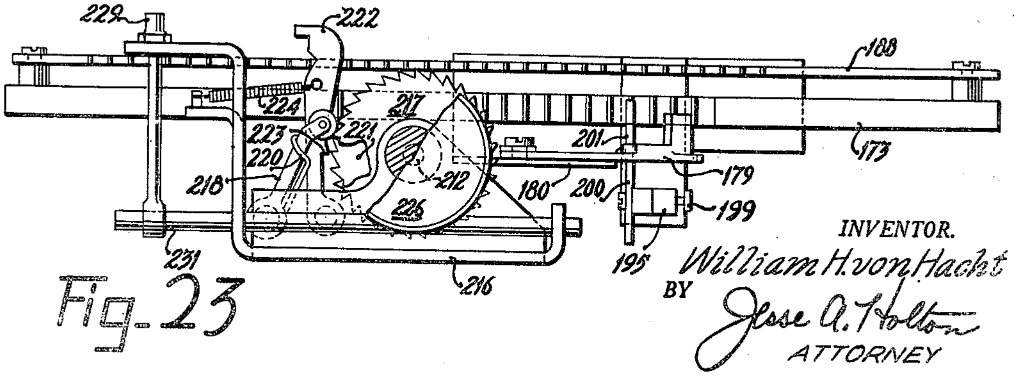

The platen frame 150, 151, 152 is urged toward the front of the machine, i. e., the initial line space position, by a spring drum 176, Figures 2 and 13, secured to the bottom of plate 151 of the platen frame and connected by a tape 177 to a post 178 on the base plate 30. A platen frame retaining pawl 179, Figures 21, 22 and 23, is pivoted on a bracket 180 secured to the right side rail 32 and is pulled by a spring 181 into engagement with the line space rack 173 to hold the platen frame in its line spaced position.

An excess movement of the platen frame 150, etc., when line spaced by pawl 171 is prevented by an overthrow pawl 184. Pawl 184 is pivoted on an arm 185 and is tensioned by a spring 186 into engagement with a stud 187 on the arm so as to prevent only rearward movement of the platen frame. A toothed rack 188 is mounted above rack 173 in a position normally clear of pawl 184. Arm 185 is pivoted on bracket 170 and is held against a stud 189 on line space plate 169 by a spring 190 connected between arm 185 and bracket 170. The clearance between rack 188 and pawl 184 is so set that one tooth of rack 188 may pass pawl 184 before the arm 185 is moved by stud 189 sufficiently to engage pawl 184 with rack 188. If the movement of the platen frame is sufficiently rapid that it would, if free, move a second line space, the pawl 184 is engaged by the succeeding tooth of rack 188 to effectively limit the movement to a single line space. Upon return of plate 169 to normal, arm 185 is freed to withdraw pawl 184 so that the platen may be manually moved to the rear if desired. A bumper 182, Figure 13, is fixed to the rear frame bar 33 in position to be contacted by the platen frame plate 151 and thus prevent noise if the operator attempts to move the platen frame past its rearmost position.

*Automatic platen return*

(Figures 2, 5, 21, 22 and 23.)

It is desirable that as many machine operations as possible shall be automatically initiated to ease the duties of the operator. The return of the platen frame 150, etc., and platen 156 is therefore made dependent upon the return of carriage 55 to its fully returned position. It is presumed that the work sheet on the platen shall be so arranged that the final typing shall be in a column further to the right than any other typing and that cam 86 on bail 84 will be the operating member for bail 84. Since key 95 has not been depressed, the carriage 55 will then be returned to its leftmost position. The carriage 55 may also be returned to this same left position by operation of key 97. A slide 191, Figure 5, slidable under the left end of rail 48 and held in its right hand position by a spring 192 has an upstanding stud 193 to be engaged by carriage 55 during the movement between its intermediate and its fully returned position to move slide 191 to the left. Slide 191 has a down turned end which engages one arm of a lever 194 pivoted on side rail 32. The other arm of lever 194 abuts the end of a rod 195 slidable in brackets 196 fixed to the side rails 32. A spring 197 secured to lever 194 and the left frame rail 32 and a stronger spring 198 between a stud 199 on rod 195 and the right frame rail 32 normally hold rod 195 to the left and lever 194 abutting its left end. A plate 200 carrying a lug 201 extending vertically therefrom and to the left of retaining pawl 179 and line space pawl 171 is secured to the right end of rod 195. The movement of the carriage 55 into its fully returned position will through slide 191 and lever 194 move rod 195 and its lug 201 to the right and release pawls 171 and 179 from their engagement with line space rack 173. The platen frame 150, 151, 152 is then free and is restored by spring drum 176 to the frontmost position in readiness for removal of the typed set of papers and for insertion of the next form set. A set of bumpers 202, Figures 2 and 13, mounted on a bracket 203 secured to base 30 are contacted by a flange on the front of platen frame plate 151 to silently arrest the free movement of the platen frame 150, etc., into the initial line space position.

*Tally strip and tally strip line spacing*

(Figures 5, 15, 16 and 19 to 23, inclusive.)

A tally strip is included in the present machine to keep a consecutive record of the work performed. The tally strip is independent of the platen and platen frame insofar as line spacing is involved and is mounted on the main frame. The tally strip supply roll 204, Figure 16, is rotatable on a rod 205 fixed in the side guides 32 above a channel in bent plate 34. The strip 206 is passed from the supply roll 204 below platen frame strip 152, across the platen 156 under the carbon paper 160, over a rod 207 and is discharged between a pair of feed rolls 208 and 209. Base plate 30 is provided with a recess extending from the front of the machine to the rear of feed rolls 208 and 209 to allow free discharge of the used section of tally strip 206 below the machine base. The rod 207 and feed rolls 208 and 209 are supported to the rear of the edge of platen 156 in its rearmost line space position by a pair of brackets 210 fixed to the base 30 between the platen frame side rails 150. The axle 211 of feed roll 209 rests in inclined slots 213 of brackets 210 to apply the pressure to the tally strip required for proper paper feed and axle 212 of roll 208 is extended to the right under the platen frame side 150 to a line space mechanism.

Figure 19:
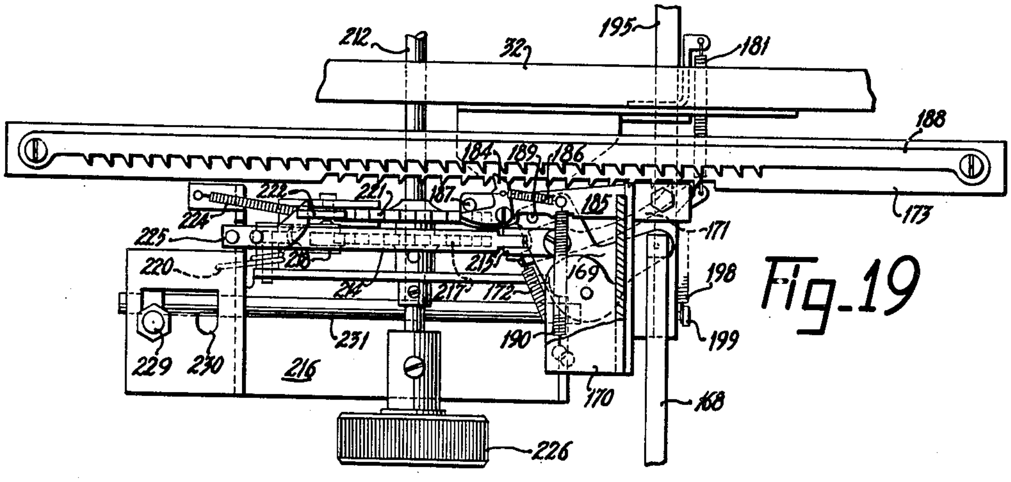
Figure 19 is a top view of the platen and tally roll feed mechanisms.
Figure 20:
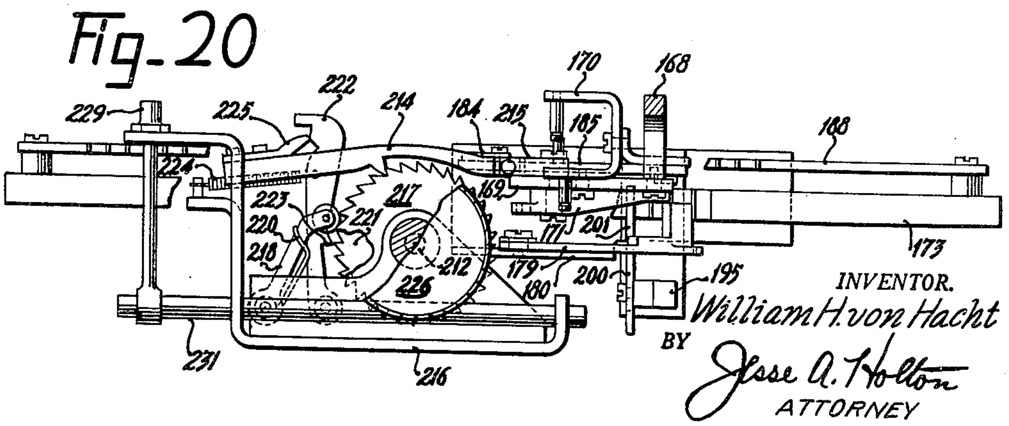
Figure 20 is a side view of the parts of Figure 19.

The feed mechanism for the tally strip, Figures 19 and 20, is operated simultaneously with the line spacing of the platen by a connection to the line space plate 169. A pawl 214 is pivoted to a link 215 pivoted on plate 169, the two pivots permitting universal movement of pawl 214, and is guided at its front end in a slot of a bracket 216 fixed to base 30. Pawl 214 engages a ratchet wheel 217 secured on feed roll shaft 212 to rotate shaft 212 and feed rolls 208 and 209 upon each operation of the platen line spacing plate 169. A roll detent 218 is pivoted on bracket 216 and is pressed against ratchet wheel 217 by a spring 220 to prevent accidental rotation of the feed rolls and maintain uniform line spacing of the tally strip 206.

Excess line spacing of the strip 206 is prevented by a second ratchet wheel 221 having its teeth in the opposite direction to those of ratchet wheel 217 and an overthrow pawl 222 actuated from pawl 214. Ratchet wheel 221 is secured to shaft 212 adjacent ratchet wheel 217 and overthrow pawl 222 is pivoted at its lower end to bracket 216 and has a tooth 223 to engage the teeth of ratchet 221. A spring 224 pulls the upper end of pawl 222 to the left in Figure 20 against an ear 225 secured to pawl 214 and out of engagement with ratchet wheel 221. Pawl 222 will be moved to engage ratchet 221 by the line spacing movement of pawl 214 and will arrest movement of the feed rolls to prevent any overthrow. A knob 226 is secured to the outer end of shaft 212 to permit manual feed of the tally strip when desired.

*Disabling line spacing for platen and tally roll*

(Figures 21, 22 and 23.)

Both the platen line spacing mechanism and the tally strip feed mechanism may be rendered ineffective when desired. The platen may be retained in its frontmost position with the line spacing mechanism ineffective by adjustment of a releasing key 229. This key passes through a C-shaped slot 230 in the top of bracket 216 and is secured to a sliding rod 231 passing through bracket 216. The rear end of rod 231 may, by moving key 229 to its rearward position, be placed to the left of an ear 232 on plate 200 to hold rod 195 in its right hand position. As rod 195 in this position releases pawls 171 and 179 from platen feed rack 173, retention of rod 195 by rod 231 effectively prevents automatic line spacing of the platen. As rod 195 is moved to the right only when the carriage is in its full return position, it is only at such times that key 229 may be set to disabling position since at other times ear 232 of plate 200 is in the path of rod 231.

The line spacing for the tally strip may be disabled independently of the key 229 so that either feeding mechanism may be used. To disable the line spacing for the tally strip feed rolls, the overthrow prevention pawl 222 is moved rearwardly sufficiently to release ear 225 of pawl 214, the pawl 214 is raised and pawl 222 is released to rest under ear 225 and retain pawl 214 in its upper position free of ratchet 217.

What is claimed is:

1. In a typewriting machine having a frame, a type carriage movable across said frame in typing and return directions, a flat platen movable on said frame in line spacing and return directions, means to return said carriage to one or another of a plurality of predetermined positions, means to urge said platen to an initial line space position on said frame, means to retain said platen in any line space position, means operated by said carriage upon return to one of said predetermined positions to line space said platen and other means operated by said carriage upon return to another of said predetermined positions to disable said retaining means to permit return of said platen to initial line space position.

2. In a typewriter having a frame, a type carriage movable across said frame in typing and return directions, a flat platen movable on said frame in line spacing and return directions, manipulative means to variably limit a return movement of said carriage, means tending to return said platen to an initial position, a latch restraining said platen in any adjusted line space position, means operated by said carriage upon its return to a limited position under control of said manipulative means, to line space said platen, and means operated by said carriage upon its return to a predetermined non-limited position to release said platen restraining latch.

3. In a typewriter having a frame, a type carriage movable across said frame in typing and return directions, a flat platen movable on said frame in line spacing and return directions, manipulative means to variably limit a return movement of said carriage, means tending to return said platen to an initial position, a latch restraining said platen in any adjusted line space position, means operated by said carriage upon its return to a limited position under control of said manipulative means, to line space said platen, means operated by said carriage upon its return to a predetermined non-limited position to release said platen restraining latch, and another manipulative means, operable when said carriage is in said predetermined non-limited position, to retain said latch in a disabled condition whereby said platen remains in the initial position.

4. In a typewriter having a frame, a type bar bearing carriage movable laterally across said frame in typing and return directions, power means to drive said carriage in the return direction, means operable to initiate operation of said power means to return said carriage to a full return position, a plurality of manipulative members to operate said initiating means and limit said return movement of said carriage to predetermined positions short of said full return position, mechanism operated by said carriage upon arrest in any returned position to terminate operation of said power means, a flat platen movable on said frame in a line spacing direction and urged to an initial position, a line spacing mechanism driven by said carriage operated terminating mechanism and operable to line space said platen, a detent to hold said platen in any adjusted line space position, and an interponent operated by said carriage in said full return position for disabling said detent and said line spacing mechanism to cause return of said platen to its initial position.

5. In a typewriter having a frame, a type bar bearing carriage movable laterally across said frame in typing and return directions, power means to drive said carriage in the return direction, means operable to initiate operation of said power means to return said carriage to a full return position, a plurality of manipulative members to operate said initiating means and limit said return movement of said carriage to predetermined positions short of said full return position, mechanism operated by said carriage upon arrest in any returned position to terminate operation of said power means, a flat platen movable on said frame in a line spacing direction and urged to an initial position, a line spacing mechanism driven by said carriage operated terminating mechanism and operable to line space said platen, a detent to hold said platen in any adjusted line space position, an interponent operated by said carriage in said full return position for disabling said detent and said line spacing mechanism to cause return of said platen to its initial position, and manually operated means for retaining said interponent in operated condition to determine retention of said platen in the initial position.

6. In a typewriter, a frame, a flat platen, a platen frame supporting said platen and slidable in said frame, means connected between said frame and said platen frame and urging said platen frame to one position, a detent on said frame to hold said platen against the tension of said urging means, platen spacing mechanism to move said platen and platen frame in increments, a carriage movable on said frame, carriage arresting means including a plurality of members each operable to determine a different limit of movement of said carriage in one direction of travel, a link operated by said carriage when arrested by said arresting means and connected to said platen spacing mechanism to operate the same, and means operated by said carriage when moved to a predetermined one of said limits of movement to release said detent and disable said platen spacing mechanism to free said platen for return to said one position.

7. In a typewriter, a frame, a flat platen, a platen frame supporting said platen and slidable in said frame, means connected between said frame and said platen frame and urging said platen frame to one position, a detent on said frame to hold said platen against the tension of said urging means, platen spacing mechanism to move said platen and platen frame in increments, a carriage movable on said frame, carriage arresting means including a plurality of members each operable to determine a different limit of movement of said carriage in one direction of travel, a link operated by said carriage when arrested by said arresting means and connected to said platen spacing mechanism to operate the same, means operated by said carriage when moved to a predetermined one of said limits of movement to release said detent and disable said platen spacing mechanism to free said platen for return to said one position, manipulative means to retain said carriage operated releasing means in operated position, power means to drive said carriage in said one direction, a member released by any of said plurality of members to engage said power means and said carriage, and a connection between said link and said member to restore said member to disengaging position.

8. In a typewriting machine having a frame, a type carriage movable across said frame in typing and return directions, a flat platen movable on said frame in line spacing and return directions, means to return said carriage to one or another of a plurality of predetermined positions, means to urge said platen to an initial line space position on said frame, means to retain said platen in any line space position, means operated by said carriage upon return to any of said predetermined positions to line space said platen, other means operated by said carriage upon return to one of said predetermined positions to disable said retaining means to permit return of said platen to initial line space position, a tally strip feed roll on said frame, mechanism for driving said feed roll in increments to line space a tally strip and a connection between said feed roll line spacing mechanism and said platen line spacing means to determine simultaneous operation of said two line spacing devices.

9. In a typewriter having a frame, a type carriage movable across said frame in typing and return directions, a flat platen movable on said frame in line spacing and return directions, manipulative means to variably limit a return movement of said carriage, means tending to return said platen to an initial position, a latch restraining said platen in any adjusted line space position, means operated by said carriage upon its return to a limited position under control of said manipulative means, to line space said platen, means operated by said carriage upon its return to a predetermined non-limited position to release said platen restraining latch, a tally sheet feed roll on said frame and means, including said first carriage operated means, for operating said tally sheet feed roll to line space a tally sheet upon each return movement of said carriage.

10. In a typewriter having a frame, a type carriage movable across said frame in typing and return directions, a flat platen movable on said frame in line spacing and return directions, manipulative means to variably limit a return movement of said carriage, means tending to return said platen to an initial position, a latch restraining said platen in any adjusted line space position, means operated by said carriage upon its return to a limited position under control of said manipulative means, to line space said platen, means operated by said carriage upon its return to a predetermined non-limited position to release said platen restraining latch, a tally sheet advancing means on said frame, operating mechanism, including a part of said carriage operated platen line spacing means, to drive said tally sheet advancing means upon each return movement of said carriage, and another manipulative means, operable when said carriage is in said predetermined non-limited position, to retain said platen restraining latch in a disabled condition whereby said platen remains in the initial position.

11. In a typewriter having a frame, a type bar bearing carriage movable laterally across said frame in typing and return directions, power means to drive said carriage in the return direction, means operable to initiate operation of said power means to return said carriage to a full return position, a plurality of manipulative members to operate said initiating means and limit said return movement of said carriage to predetermined positions short of said full return position, mechanism operated by said carriage upon arrest in any returned position to terminate operation of said power means, a flat platen movable on said frame in a line spacing direction and urged to an initial position, a line spacing mechanism driven by said carriage operated terminating mechanism and operable to line space said platen, a detent to hold said platen in any adjusted line space position, an interponent operated by said carriage in said full return position for disabling said detent and said line spacing mechanism to cause return of said platen to its initial position, and a tally strip advancing means operated by said platen line spacing mechanism to advance a tally strip relative to said type bar bearing carriage upon each return of said carriage.

12. In a typewriter having a frame, a type bar bearing carriage movable laterally across said frame in typing and return directions, power means to drive said carriage in the return direction, means operable to initiate operation of said power means to return said carriage to a full return position, a plurality of manipulative members to operate said initiating means and limit said return movement of said carriage to predetermined positions short of said full return position, mechanism operated by said carriage upon arrest in any returned position to terminate operation of said power means, a flat platen movable on said frame in a line spacing direction and urged to an initial position, a line spacing mechanism driven by said carriage operated terminating mechanism and operable to line space said platen, a detent to hold said platen in any adjusted line space position, an interponent operated by said carriage in said full return position for disabling said detent and said line spacing mechanism to cause return of said platen to its initial position, a tally strip mechanism on said frame, means operated by said platen line spacing mechanism independently of the effectiveness of said platen line spacing mechanism to advance the platen, to line space said tally strip with respect to said frame, and manually operated means for retaining said interponent in operated condition to determine retention of said platen in the initial position.

13. In a typewriter, a frame, a flat platen, a platen frame supporting said platen and slidable in said frame, means connected between said frame and said platen frame and urging said platen frame to one position, a detent on said frame to hold said platen against the tension of said urging means, platen spacing mechanism to move said platen and platen frame in increments, a carriage movable on said frame, carriage arresting means including a plurality of members each operable to determine a different limit of movement of said carriage in one direction of travel, a link operated by said carriage when arrested by said arresting means and connected to said platen spacing mechanism to operate the same, means operated by said carriage when moved to a predetermined one of said limits of movement to release said detent and disable said platen spacing mechanism to free said platen for return to said one position, a tally strip support and a pair of tally strip feed rolls on said frame, said platen being positioned between said support and said rolls so that a strip of tally paper may pass from said support, over said platen and through said feed rolls, means operated by said carriage operated link to rotate said feed rolls to line space said tally strip, manipulative means to retain said detent and platen spacing mechanism in their ineffective condition and a manually separable connection in said feed roll rotating means to disable said tally strip line spacing mechanism.

14. In a typewriter having a frame, a type carriage shiftable on said frame in typing and return directions, a flat platen, a platen carrying frame movable on said frame in line spacing and return directions at right angles to the movement of said carriage, a tally mechanism mounted on said frame comprising a supply roll support and a tally strip feed roll on opposite sides of said platen, the tally strip passing from said supply roll, over said platen and to said feed roll and means to advance a tally strip past said type carriage including a yielding stop to limit movement of said type carriage in one direction, mechanism to rotate said feed roll and a connection between said stop and said feed roll mechanism to advance the tally strip upon arrest of said carriage by said stop.

15. In a typewriter having a frame, a typing carriage having type bars and movable on said frame in typing and return directions, and a platen shiftable under said typing carriage in a direction at right angles to the line of movement of said carriage, means to move said carriage in the return direction, a stop to engage said carriage at a predetermined point and arrest the return movement thereof, means mounting said stop for limited movement by said carriage at the end of the return movement thereof, and means to feed a tally strip between said typing carriage and said platen comprising a feed roll on said frame, a feed roll advancing means and a connection from said advancing means to said stop mounting means to operate said advancing means by the movement of said stop in arresting the return movement of said carriage.

WILLIAM H. VON HACHT.

REFERENCES CITED

The following references are of record in the file of this patent:

UNITED STATES PATENTS

| Number | Name | Date |
|---|---|---|
| 705,522 | Fisher | July 22, 1902 |
| 1,730,567 | Foothorap | Oct. 8, 1929 |
| 1,909,148 | Foothorap | May 16, 1933 |